No. 896,898. PATENTED AUG. 25, 1908.
L. E. DANIELS.
COOKING UTENSIL.
APPLICATION FILED OCT. 30, 1907.
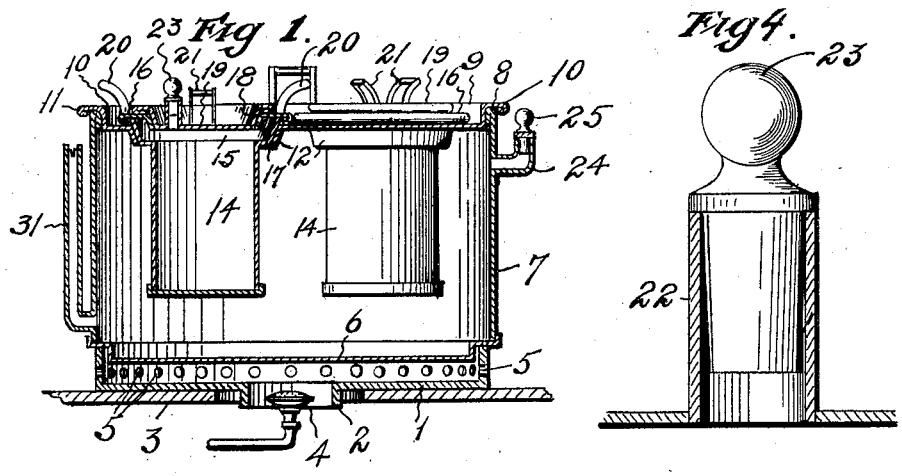
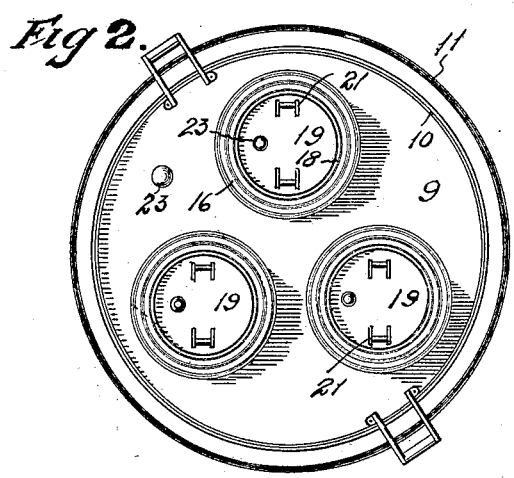
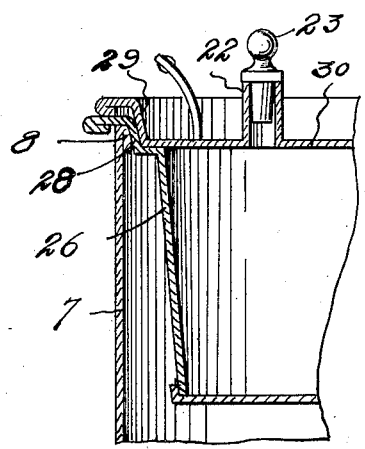
WITNESSES:
M. Heafer
L. Hern.
INVENTOR
Laura E. Daniels
BY
John M. Spellman
ATTORNEY

UNITED STATES PATENT OFFICE.

LAURA E. DANIELS, OF FORT WORTH, TEXAS.

COOKING UTENSIL.

No. 896,898.   Specification of Letters Patent.   Patented Aug. 25, 1908.

Application filed October 30, 1907. Serial No. 399,885.

*To all whom it may concern:*

Be it known that I, LAURA E. DANIELS, citizen of the United States, residing at Fort Worth, in the county of Tarrant and State of Texas, have invented certain new and useful Improvements in Cooking Utensils, of which the following is a specification.

My invention relates to new and useful improvements in cooking utensils and more particularly to that class known as "steam cookers."

The object of the invention is to provide a cooker in which the several parts are arranged in such a manner as to provide steam tight joints.

Another feature is the provision of a single cooking receptacle and certain other improvements on the cooking utensil set forth in the Letters Patent granted to me November 20th, 1906 and numbered 836,098.

Finally the object of the invention is to provide a device of the character described that will be strong, durable, efficient and simple and comparatively inexpensive to make; also one in which the several parts will not be liable to get out of working order.

With the above and other objects in view, the invention has relation to certain novel features, an example of which is described in the specification and illustrated in the accompanying drawings, wherein:

Figure 1 is a transverse vertical sectional view of the cooker, and a portion of a stove, Fig. 2 is a plan view, Fig. 3 is a transverse vertical sectional view similar to Fig. 1, but showing the single cooking receptacle in place, and Fig. 4 is a detail sectional view of one of the steam vent constructions.

In the drawings the numeral 1 designates a flanged base-plate, provided with a central opening and a depending collar 2, which when the plate is placed upon the top of a suitable stove as 3, surrounds the burner 4 so as to provide a suitable air space therebetween. The flanged portion of the base-plate is provided with a plurality of perforations 5, which permit a free circulation between the bottom 6 of the boiler 7 and the base-plate.

The boiler 7 is preferably cylindrical in shape and provided at its upper open end with an inturned lap 8. The upper end of the boiler or cooker is closed by a cover 9 having an upward and outwardly flared ring portion 10 from which an outwardly directed flange 11 extends laterally. The ring portion 10 fits snugly against the lap 8 while the flange 11 rests on the boiler thus forming to a reasonable degree, a steam-tight joint. The cover 9 is provided with a plurality of circular openings surrounded by downwardly directed flanges 12. It is to be understood that these openings receive cooking receptacles 14 and as many of the receptacles as are desired may be used, the number of course depending upon the size of the cover and the boiler.

The upper end of each cooking receptacle 14 is enlarged and provided with an upward and outwardly flared flanged ring portion 15 fitting snugly within the flange 12 and resting on cover 9 so as to provide a steam tight-joint. This ring portion receives a closure ring 16 provided with a depending flange 17 adapted to receive the upward and outwardly flared ring portion 18 of a flanged lid or closure 19 as clearly shown in Fig. 1 and thus providing steam-tight joints. The closure ring 16 is secured to the ring portion 15 and provided with handles 20 by which the receptacle 14 may be removed from the cover 9 and boiler 7. The lid 19 is also provided with a suitable handle 21 by which it may be removed without removing the receptacle. Each of the lids 19 and the cover 9 are provided with vertical vent sleeves 22 which receive tapered and shouldered vent valves 23, fitting flatly on the sleeve and adapted to be raised by the steam under pressure to relieve the same. At one side the boiler 7 is provided with an elbow 24 which receives a vent valve 25 similar to the valve 23. In this way there is no danger of excessive expansion or injury to the parts.

In Fig. 3 I have shown a single cooking receptacle 26 fitting in the boiler 7 in close contact with the lap 8 to provide a steam-tight joint. This receptacle is desirable for cooking fowls, meats and etc. When this receptacle is used, the cover 9 and receptacles 14 are omitted. A flanged closure ring 27 having a depending inclined flange 28 is secured to the top of the receptacle. The flange 28 receives the upward and outwardly flared ring portion 29 of a flanged cover or closure 30 so as to provide a steam-tight joint. This cover is also provided with a vent sleeve 22 and valve 23. A suitable signal pipe 31 has connection with the boiler 7 near the bottom 6, so as to operate a whistle or other signal when the water becomes low and the steam passes into the pipe.

What I claim, is:

In a cooking utensil, the combination with a boiler having an open upper end, of a cover provided with an outwardly and upwardly inclined flanged portion, said portion arranged to fit in the upper end of the boiler and to form therewith a steam tight joint, said cover having a plurality of openings surrounded by depending flanges, receptacles provided with outward and upwardly inclined flanged portions, said flanged portions fitting tightly within the openings of the cover to form therewith steam tight joints, closure rings provided with depending flanges and secured to the flanged portion of the receptacle, lids provided with outward and upwardly inclined flanged portions, said flanged portions fitting tightly in the flanges of the closure rings to form therewith steam tight joints, a valve arranged on each lid to relieve the pressure in the respective receptacle, and a valve arranged to relieve the pressure within the boiler.

In testimony whereof I have signed my name to this specification in the presence of two subscribing witnesses.

LAURA E. DANIELS.

Witnesses:
E. W. DANIELS,
L. HERN.